US009057935B2

(12) United States Patent
Vieira Caeiro Dias Antunes

(10) Patent No.: US 9,057,935 B2
(45) Date of Patent: Jun. 16, 2015

(54) CONTROLLED VIDEO CAMERA STABILIZER

(71) Applicant: GRIPGEAR Limited, Wan Chai (HK)

(72) Inventor: João Miguel Vieira Caeiro Dias Antunes, Lisboa (PT)

(*) Notice: Subject to any disclaimer, the term of this patent is extended or adjusted under 35 U.S.C. 154(b) by 0 days.

(21) Appl. No.: 14/269,122

(22) Filed: May 3, 2014

(65) Prior Publication Data
US 2014/0339841 A1    Nov. 20, 2014

Related U.S. Application Data

(63) Continuation-in-part of application No. PCT/PT2013/000028, filed on May 7, 2013.

(30) Foreign Application Priority Data

May 8, 2012  (PT) .......................... 106303

(51) Int. Cl.
G03B 17/56 (2006.01)
F16M 13/04 (2006.01)
F16M 11/06 (2006.01)
F16M 11/12 (2006.01)
(Continued)

(52) U.S. Cl.
CPC ........... *G03B 17/563* (2013.01); *F16M 11/123* (2013.01); *F16M 11/32* (2013.01); *F16M 13/00* (2013.01); *F16M 13/04* (2013.01); *F16M 2200/04* (2013.01); *F16M 11/06* (2013.01)

(58) Field of Classification Search
CPC ... G03B 17/563; F16M 11/123; F16M 11/32; F16M 13/00; F16M 13/04; F16M 11/06; F16M 2200/04

USPC ............ 396/421; 352/243; 348/376; 294/139
See application file for complete search history.

(56) References Cited

U.S. PATENT DOCUMENTS

| 2,007,215 A | | 7/1935 | Remey | |
|---|---|---|---|---|
| 5,243,370 A | * | 9/1993 | Slater | ............................ 352/243 |
| 5,650,821 A | * | 7/1997 | Hewlett | ........................ 348/373 |

(Continued)

FOREIGN PATENT DOCUMENTS

GB            944564 A     12/1963

OTHER PUBLICATIONS

European Patent Office as International Searching Authority, International search report for PCT/PT2013/000028, date of mailing Sep. 6, 2013.

(Continued)

*Primary Examiner* — W B Perkey

(57) ABSTRACT

The present invention discloses a stabilizing apparatus for a camera. The apparatus may comprise a mount supporting a camera; a support coupled to said mount with a movable joint; and a counterweight system extending outwardly from said mount. One or more counterweights of said counterweight system may be positioned on an opposite side of said movable joint to said mount. The counterweight system may be configured to surround a space occupied by the movable joint. The counterweight system may comprise one or more movable counterweights which can move reciprocally relative to said counterweight system in response to movement of the support relative to the mount making it possible to gently steer the direction of shooting without losing the stability of the video camera caused by rapid oscillations of the support.

20 Claims, 2 Drawing Sheets

(51) Int. Cl.
*F16M 11/32* (2006.01)
*F16M 13/00* (2006.01)

(56) References Cited

U.S. PATENT DOCUMENTS 5,742,859 A * 4/1998 Acker ........................... 396/419
7,090,416 B2 * 8/2006 Mootz et al. .................. 396/421
2005/0053371 A1 * 3/2005 Schaller ........................ 396/421
2011/0188847 A1 * 8/2011 McKay .......................... 396/421
2012/0106941 A1 * 5/2012 Greaves et al. ............... 396/421

OTHER PUBLICATIONS

European Patent Office as International Searching Authority, International search report for PCT/PT2013/000028, date of mailing Nov. 11, 2014.

* cited by examiner

CONTROLLED VIDEO CAMERA STABILIZER

CROSS-REFERENCE TO RELATED APPLICATIONS

This patent application is a continuation-in-part patent application of co-pending International Patent Application Number PCT/PT2013/000028 filed on 7 May 2013, claiming priority from PT106303 filed on 8 May 2012.

FIELD OF THE INVENTION

The invention relates to a video camera stabilizer controlled in an innovative way, as defined by the appended claims, which works both as a support to steady the video camera and also as a means to control the direction of shooting.

BACKGROUND OF THE INVENTION

Prior art video stabilizers often involve stabilizing the video camera using a counterweight supported by a gimbal or swivel ball connected to an handle, it being necessary to apply a force directly to the camera or counterweight to control and change a shooting direction of the camera, normally using the hand that is not holding the handle. This requires considerable expertise on the part of the camera operator to apply gentle forces to get and maintain a stable and smooth footage for the intended video camera direction. The difficulty increases where the total weight of the video camera is more than the counterweight, since it will take less strength and higher sensitivity to affect the equilibrium of the system. Current developments in technology provide smaller and very low weight video cameras which can be used with traditional video stabilizers, but it is necessary to add weight to the video camera stabilizer, on the side of the camera, so that it may return to balance, making possible the control of the camera in the traditional way, but losing the benefit of being able to have a stable and compact lightweight shooting system.

Examples of such systems are disclosed in WO2011127600 of 2011 Oct. 20, CN201903734 of 2011 Jul. 20, US2011157384 of 2011 Jun. 30, CN201191347 of 2009 Feb. 04 and US2009257741 of 2009 Oct. 15.

SUMMARY OF THE INVENTION

The stabilizing apparatus for is camera may comprise a mount supporting a camera; a support coupled to said mourn with a movable joint; and a counterweight system extending outwardly from said mount. One or more counterweights of said counterweight system may be positioned on an opposite side of said movable joint to said mount. The counterweight system may be configured to surround a space occupied by the movable joint. The counterweight system may comprise one or more movable counterweights which can move reciprocally relative to said counterweight system in response to movement of the support relative to the mount making it possible to gently steer the direction of shooting without losing the stability of the video camera caused by rapid oscillations of the support. The support may comprise a handle to be gripped by a user. The counterweight system may surround a handle gripping space.

In preferred arrangements, the counterweight system comprises one or more movable counterweights which can move reciprocally relative to said counterweight system in response to movement of the support relative to the mount. The counterweight system may comprise a plurality of legs that extend away from said mount. The counterweight system may comprise one or more movable counterweights which can move reciprocally relative to said counterweight system. Each of the one or more movable counterweights may be arranged to move reciprocally along a respective one of said legs. The counterweight system may comprise a plurality of set counterweights supported on said plurality of legs at set points. The positions of said set counterweights at set positions on said legs may be manually adjustable.

In another aspect, there is provided a stabilizing apparatus for a handheld camera, comprising: a mount for selectively receiving and retaining a camera; a handle, wherein said handle is coupled to said mount with a gimbal joint; a plurality of legs that extend away from said mount; a plurality of first counterweights supported on said plurality of legs at set points; and one or more second movable counterweights supported by one or more of said legs, wherein said one or more movable counterweights can move reciprocally along respective ones of said legs.

Preferably, the apparatus has a plurality of second movable counterweights supported by said plurality of legs, wherein said plurality of movable counterweights can move reciprocally along respective ones of said plurality of legs. Cords may be provided which extend from said plurality of movable counterweights to retain said plurality of movable counterweights in adjusted positions along said plurality of legs. The cords may extend from said plurality of movable counterweights to said handle, wherein movement of said handle relative to said plurality of legs causes said plurality of counterweights to move on said plurality of legs.

The apparatus may have turnbuckles or the like on said cords for selectively adjusting said plurality of cords by length and therein adjusting said adjusted positions.

In some embodiments, magnetic weights may be provided which magnetically adhere to said plurality of movable counterweights to selectively add mass to said plurality of movable counterweights.

The plurality of legs may extend symmetrically from said mount around said handle. The plurality of legs may be coupled to said mount at pivot connections.

In another aspect, the stabilizing, apparatus for a camera comprises a mount for receiving a camera; a handle, wherein said handle is coupled to said mount with a movable joint; legs that extend away from said mount; a plurality of movable counterweights that are supported by said legs; and cords that extend from said handle to each of said plurality of movable counterweights, wherein relative movement between said handle and said legs causes said cords to move said plurality of movable counterweights on said legs.

The apparatus may include a plurality of counterweights that are connected to said legs at set points. Adjustment means may be provided on said cords for selectively adjusting the lengths of said plurality of cords. Magnetic weights may be provided which magnetically adhere to said plurality of movable counterweights to selectively add mass to said plurality of movable counterweights.

The legs may be coupled to said mount with pivot connections. Said movable may be a gimbal joint.

BRIEF DESCRIPTION OF THE DRAWINGS

The foregoing and further features of the present invention will be apparent from the following description of preferred embodiments which are provided by way of example only in connection with the accompanying figures, of which:

FIG. 2 is another side view of the stabilizing apparatus for a camera with a camera retained in the mount where the camera is viewed edge on.

DETAILED DESCRIPTION

Figure 1:
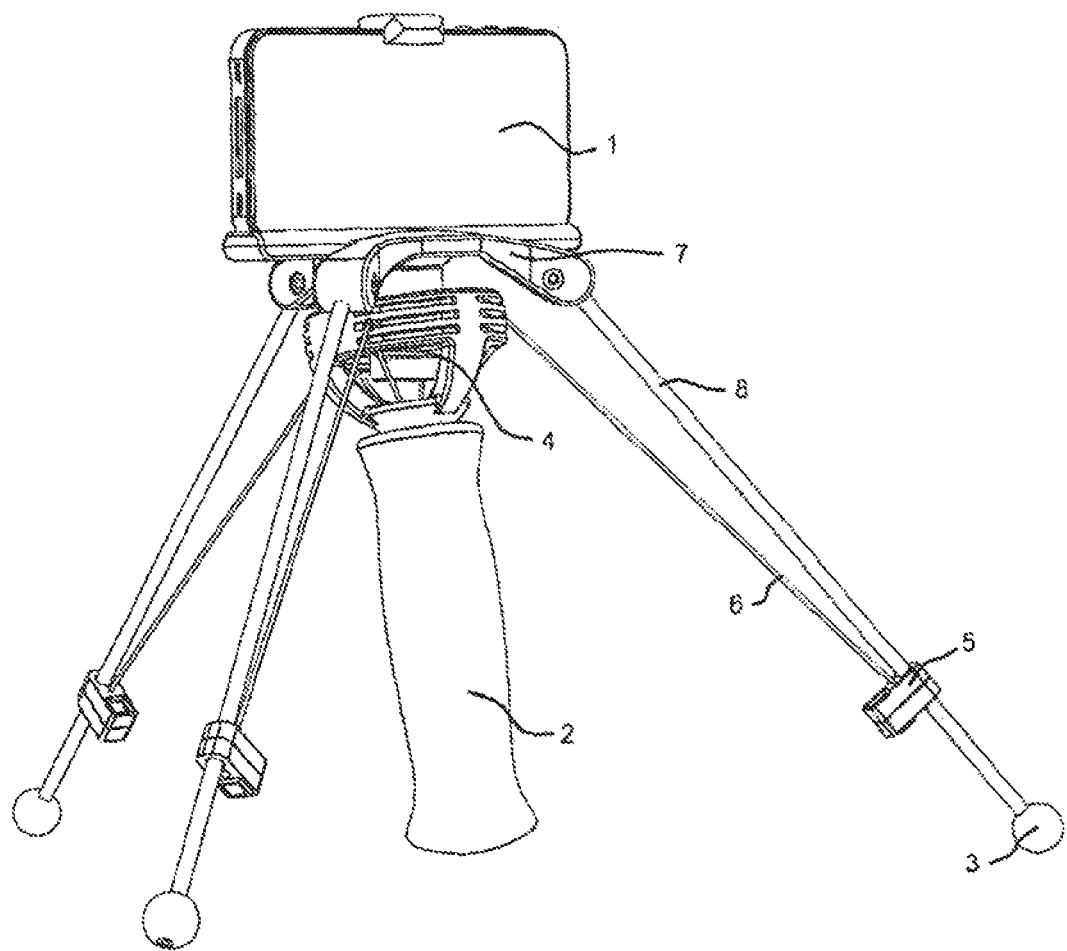
FIG. 1 is a side view of the stabilizing apparatus for a camera with a camera retained in the mount.
Figure 2:
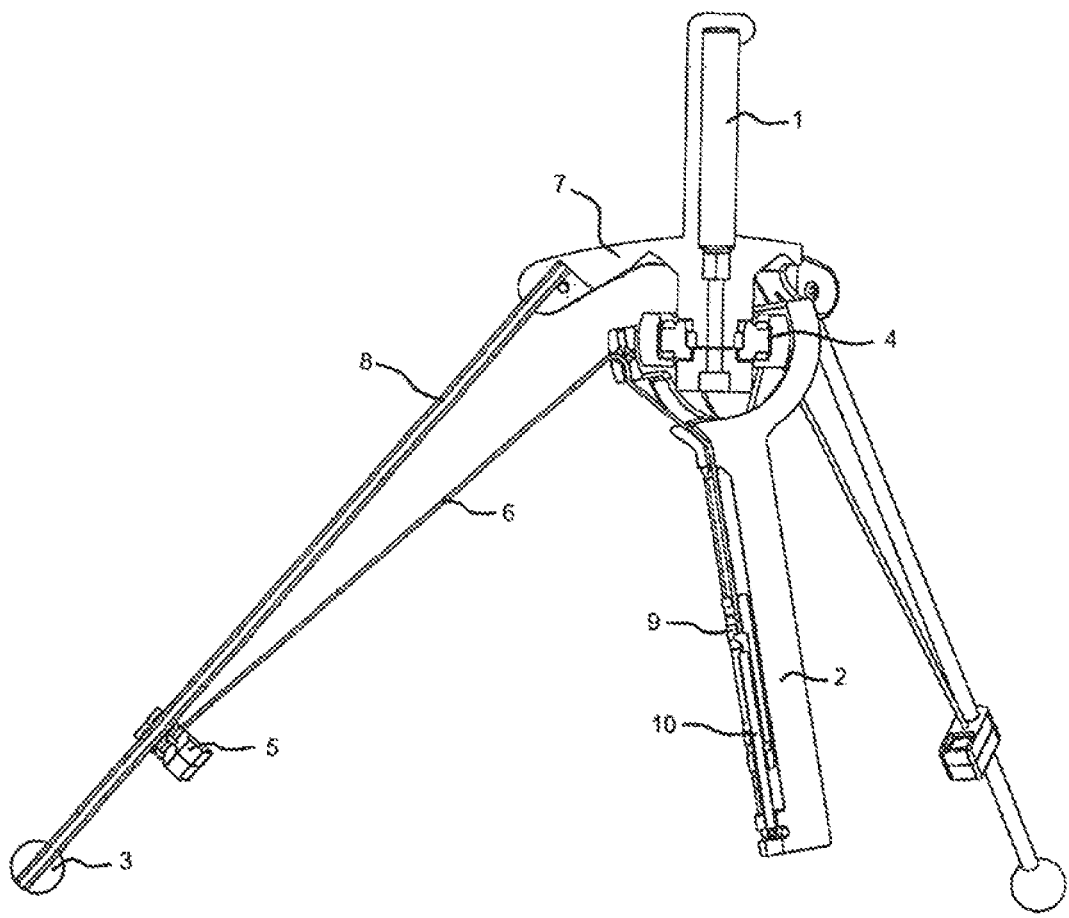

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described but not other embodiments.

A video camera (1) is mounted on a tripod (7) or similar structure with fixed position or adjustable position counterweights (3) preferably placed at the ends of the legs (8), although the counterweights (3) may be positioned at other set points on the legs(8) when calibrating the apparatus when a camera (1) is placed in the camera mount. The apparatus is thereby stabilized and a shooting direction for the camera can be controlled by the support or handle (2), which is joined to the tripod (7) via a gimbal (4) with free rotational axis. The movable counterweights (5) are hung on the handle (2) via cords (6) and move on the tripod legs (8) depending on the relative angles between the handle (2) and the tripod (7), thus changing the equilibrium point of the whole video camera (1), making it possible to gently steer the direction of shooting on angles yaw, pitch and roll without losing the stability of the video camera caused by rapid oscillations of the handle (2). The calibration of the equilibrium point can be achieved by adjusting the turnbuckles (9) of the cords (6) which are situated inside the handle (2), having adjusting screws (10) for adjusting the position of the movable counterweights (5) independently.

The invention solves the problem of stabilizing and controlling a video camera through a simple mechanical process, independently of using a reduced weight video camera and stabilizer. The invention enables the control of the video shooting direction exclusively through the guidance of the handle (2) while maintaining the stability of the video camera under rapid oscillations thereof. It simplifies and makes the shooting of stabilized, videos intuitive for any camera operator, even without experience and using only one hand.

In one embodiment, the invention may comprise a mechanical feedback balance of the video camera (1) plus the fixed position or settable position counterweights (3), plus the tripod (7) through the mobile counterweights (5). The masses of counterweights (3) and (5) are adapted to the weight of the video camera (1), minimizing the overall weight of the apparatus. The movement of the mobile counterweights (5) on the tripod legs (8) leads to a change of the application point of their weight on the tripod (7), changing the equilibrium point of the system: video camera (1), more tripod (7), more counterweights 3, 5). The dynamic response of the system to oscillations induced in the handle (2) and the optimum damping coefficient are set by the mass of the movable counterweights (5), the aperture angle of the tripod legs (8) and the coefficient of friction between them when the movable counterweights (8) move due to the relative change of angles between the handle (2) and the tripod (7). This thereby provides a system feedback loop which work as a low pass filter, capable of eliminating undesired high frequency oscillations of the handle (2) relative to the video camera (1), and letting through the low frequency oscillations, i.e. user hand movements controlling motion of the handle (2), to control movement of the video camera (1). The device operates simultaneously for all rotation axes, yaw, pitch and roll. The time response to changes in handle (2) can also be adjusted by the operator by adding or removing mass to the fixed or position settable counterweights (3) and/or to the movable counterweights (5). Magnetic mass can be used for this purpose, making it easy to add and remove mass from the counterweights (3, 5). Other configurations with different localization and number of fixed and movable counterweights can be provided maintaining the same system feedback loop.

The mechanical process of feedback balance to stabilize and control the video camera (1) is obtained through mourning it to a tripod (7) or similar structure with fixed position or position settable counterweights (3) preferably placed at the lower ends of the legs (8). The video camera (1) is stabilized and has the direction of shooting controlled through the handle (2), which is attached to the tripod (7) through a gimbal (4) with the axis of rotation free. The movable counterweights (5) are hung on the handle (2) via cords (6) and move on the tripod legs (8) depending on the relative angles between the handle (2) and the tripod (7), thus changing the equilibrium point of the whole video camera (1) relative to the tripod (7) and counterweights (3), making it possible to gently steer the direction of shooting for the angles yaw, pitch and roll without losing the stability of the video camera (1) caused by rapid oscillations of the handle (2). The calibration of the equilibrium point is achieved by adjusting the turnbuckles (9) of the cords (6) which are situated inside the handle (2), having adjusting screws (10) for adjusting the position of the movable counterweights (5) independently.

All the stabilizing system including the video camera (1), the counterweights (3), the gimbal (4), the movable counterweights (5), the cords (6), the tripod (7) and the legs (8) can optionally be mounted inside a protective transparent housing, this way protecting the stabilizing system against rain, wind or underwater use. The handle (2) left outside the housing but rigidly connect to it allows the control of the shooting direction.

It can be seen that the counterweight system comprising the tripod or some other structure and the counterweights (3, and/or 5) is such that the counterweight system surrounds a space occupied by the moveable joint (4), e.g. the gimbal (4) and that it may even extend to an extent that it surrounds a handle gripping space. This arrangement of the apparatus is such that it provides very stable operation of the apparatus to filter out high frequency oscillations or movements of the support/handle (2) relative to the camera mount/retention means. The camera may comprise a smart phone, tablet computer or similar handheld electronic device with a camera function.

The invention is not limited to the above arrangements, other configurations and modifications are possible still remaining within the scope of following claims.

What is claimed is:

1. A stabilizing apparatus for a camera, comprising:
 a mount for supporting a camera;
 a support, said support being coupled to said mount with a movable joint; and a counterweight system extending outwardly from said mount such that one or more counterweights of said counterweight system are positioned on an opposite side of said movable joint to said mount, wherein the counterweight system comprises one or more movable counterweights which move reciprocally relative to said counterweight system in response to movement of the support relative to the mount.

2. The apparatus according to claim 1, wherein the support comprises a handle and the counterweight system surrounds a handle gripping space.

3. The apparatus according to claim 1, wherein the counterweight system surrounds a space occupied by the movable joint.

4. The apparatus according to claim 1, wherein the counterweight system comprises a plurality of legs that extend away from said mount.

5. The apparatus according to claim 4, wherein the counterweight system comprises one or more movable counterweights which can move reciprocally relative to said counterweight system and wherein each of the one or more movable counterweights is arranged to move reciprocally along a respective one of said legs.

6. The apparatus according to claim 4, wherein the counterweight system comprises a plurality of set counterweights supported on said plurality of legs at set points.

7. A stabilizing apparatus for a handheld camera, comprising:
a mount for selectively receiving and retaining a camera;
a handle, wherein said handle is coupled to said mount with a gimbal joint;
a plurality of legs that extend away from said mount;
a plurality of first counterweights supported on said plurality of legs at set points; and
one or more second movable counterweights supported by one or more of said legs, wherein said one or more movable counterweights can move reciprocally along respective ones of said legs.

8. The apparatus according to claim 7, wherein the apparatus has a plurality of second movable counterweights supported by said plurality of legs, wherein said plurality of movable counterweights can move reciprocally along respective ones of said plurality of legs.

9. The apparatus according to claim 8, further including cords that extend from said plurality of movable counterweights to retain said plurality of movable counterweights in adjusted positions along said plurality of legs.

10. The apparatus according to claim 9, wherein said cords extend from said plurality of movable counterweights to said handle, wherein movement of said handle relative to said plurality of legs causes said plurality of counterweights to move on said plurality of legs.

11. The apparatus according to claim 9, further including turnbuckles on said cords for selectively adjusting said plurality of cords by length and therein adjusting said adjusted positions.

12. The apparatus according to claim 9, further including magnetic weights that magnetically adhere to said plurality of movable counterweights to selectively add mass to said plurality of movable counterweights.

13. The apparatus according to claim 8, wherein said plurality of legs symmetrically extend from said mount around said handle.

14. The apparatus according to claim 8, wherein said plurality of legs are coupled to said mount at pivot connections.

15. A stabilizing apparatus for a camera, comprising:
a mount for receiving a camera;
a handle, wherein said handle is coupled to said mount with a movable joint;
legs that extend away from said mount;
a plurality of movable counterweights that are supported by said legs; and
cords that extend from said handle to each of said plurality of movable counterweights, wherein relative movement between said handle and said legs causes said cords to move said plurality of movable counterweights on said legs.

16. The apparatus according to claim 15 further including a plurality of counterweights that are connected to said legs at set points.

17. The apparatus according to claim 15, further including adjustments on said cords for selectively adjusting said plurality of cords by length.

18. The apparatus according to claim 15, further including magnetic weights that magnetically adhere to said plurality of movable counterweights to selectively add mass to said plurality of movable counterweights.

19. The apparatus according to claim 15, wherein said legs are coupled to said mount with pivot connections.

20. The apparatus according to claim 15 wherein said movable joint is a gimbal joint.

* * * * *